Feb. 15, 1927. G. O. WILMS Re. 16,551

DASHPOT CONTROLLED SWITCH

Original Filed Feb. 20, 1920

Inventor

Gustav O. Wilms

By Ira Milton Jones

Attorney

Reissued Feb. 15, 1927. Re. 16,551

UNITED STATES PATENT OFFICE.

GUSTAV O. WILMS, OF MILWAUKEE, WISCONSIN, ASSIGNOR TO THE RELIANCE COMPANY, OF MILWAUKEE, WISCONSIN, A CORPORATION OF WISCONSIN.

DASHPOT-CONTROLLED SWITCH.

Original application filed February 20, 1920, Serial No. 360,098, Patent No. 1,449,025, March 20, 1923. Divided and application filed February 26, 1923, Serial No. 621,353, Patent No. 1,584,063, dated May 11, 1926. Application for reissue filed December 15, 1926. Serial No. 155,067.

This invention relates to certain new and useful improvements in dash-pot controlled mechanism and is more particularly directed to the provision of means for regulating or controlling the time factor in the operation of the switch forming part of the mechanism.

This application is a division of my copending one for dash-pot controlled switch filed February 20, 1920, Serial No. 360,098.

It is an important object of this invention to provide a switch, adapted to be opened upon adverse conditions in the circuit in which the same is included, employing a delay device to prevent opening of the circuit upon a momentary or temporary overload and having means for readily adjusting the time factor in the operation of the switch.

Another object of this invention resides in the provision of means permitting the ready adjustment of the time factor of the switch and having suitable designations thereon in which the time factor may be set at any definite point.

Another object of this invention resides in the provision of an improved adjustable connection between the delay device and the armature core which is actuated to overcome the delay device upon the load in the circuit increasing beyond a predetermined degree.

It is another object of this invention to simplify and otherwise improve the structure and the convenience with which said devices may be adjusted for the various conditions of use under which they would be desired to operate.

A further important object resides in the provision of a dash-pot structure having its parts so arranged as to procure a desired prolonged retarding action, with an exceedingly short stroke of the piston member, whereby a desired compactness of structure is procured, and whereby, with respect to the switch operating solenoid, a maximum adjustment of the armature core therein may be permitted, so as to provide for desired operation of the switch mechanism under a wide range of current conditions.

A further object of this invention resides in the provision of an improved relay structure wherein the dash-pot is secured flush against the side of the solenoid frame to reduce the overall size of the relay and at the same time permit the detachment of the dash-pot assembly for the purpose of adjusting the distance the armature projects therefrom while the dash-pot is apart from the relay frame.

A still further object resides in the provision of an arrangement whereby the dash-pot structure may be most readily connected with or disconnected from its support, to permit adjustment or inspection, and whereby, in the present structure, the armature plunger member may be most readily adjusted to vary its effective length and held in such adjustment without the use of set screws or other members requiring independent manipulation to permit the adjustment.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated one complete example of the physical embodiment of my invention constructed according to the best mode I have so far devised for the practical application of the principles thereof, and in which.

Figure 1:
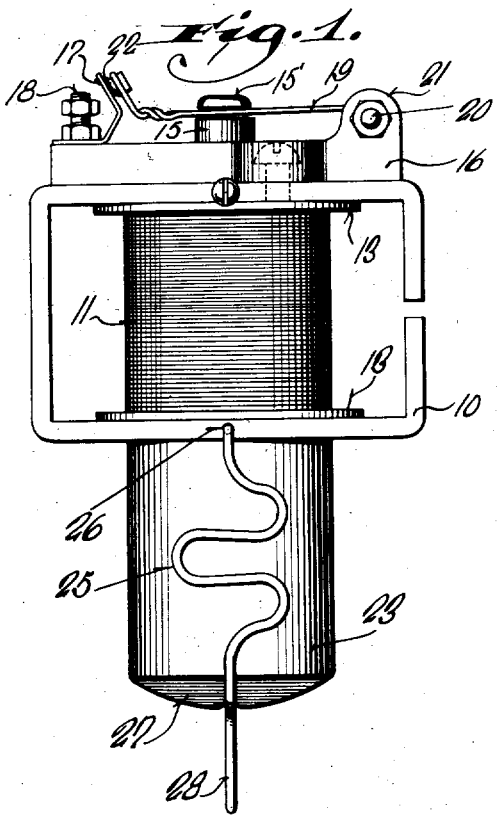
Figure 1 is a side elevational view of a magnetically operated switch mechanism embodying my invention.
Figure 2:
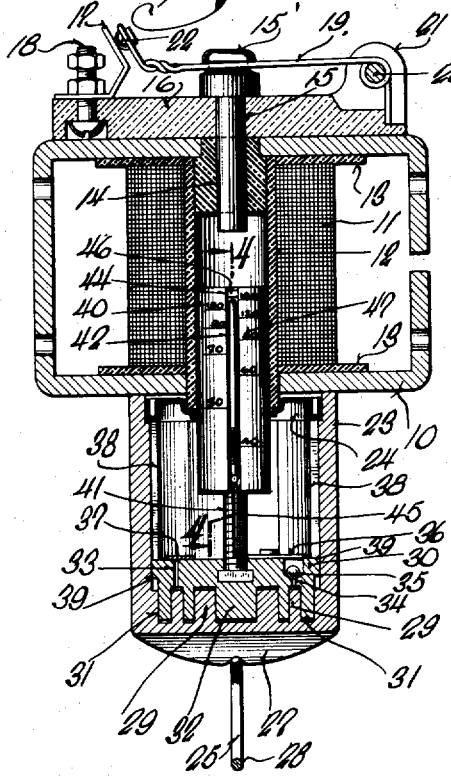
Figure 2 is a vertical, longitudinal, sectional view therethrough on a plane indicated by the line 2—2 of Figure 3.
Figure 3:
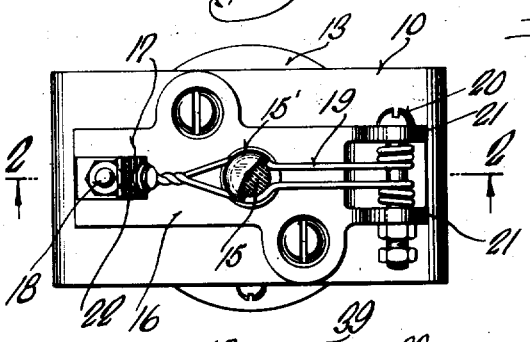
Figure 3 is a plan view of the switch mechanism.
Figure 4:
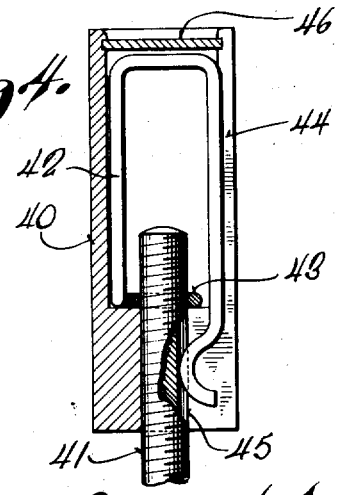
Figure 4 is a detail view of the adjustable connection between the armature core and the screw stem, said view being partly in section and partly in elevation and taken through Figure 2 on the plane of line 4—4.
Figure 5:
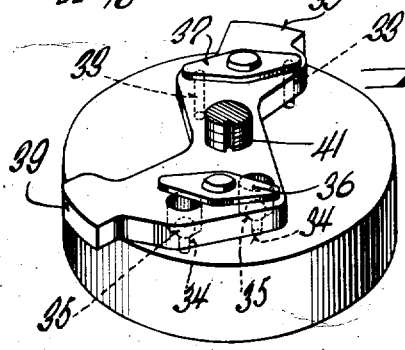
Figure 5 is a perspective view of the piston, somewhat enlarged, showing thereon the ports and the valves therefor.

Referring now more particularly to the drawings, in the present embodiment of my invention, the various parts are carried by a frame formed of a metallic strap 10, bent in substantially rectangular shape and provided with attaching bolt holes in the ends of the frame. A solenoid coil 11 has its conventionally shown convolutions disposed between the sides of the frame and wound upon a core sleeve 12, which has one end projected through one side of the frame to provide an annular holding shoulder, the usual end plates 13 of the coil being engaged against the inner sides of the frame.

A bushing member 14 is fitted within the other end of the core sleeve and extends through the other side of the frame. A tappet pin 15 is slidably mounted in the bushing and extends through an insulating block 16 disposed on the adjacent side of the frame, said side of the frame being disposed uppermost in the present embodiment of my invention.

The stationary contact member of a switch structure mounted on block 16, comprises a plate 17, secured on one end of the insulating block by a binding post 18, the contact portion of the plate being inclined obliquely outward. The movable contact member comprises, in the present instance, a length of wire 19, doubled upon itself and having its end portions oppositely coiled on a bolt 20, carried by upstanding ears 21 on the remote end portion of the insulating block. The ends of the wire are directed inwardly and engage block 16 to prevent rotation of the coil portions on the bolt, and said wire possesses considerable resilience, whereby its bent portion, constituting the free end of the movable contact member, is resiliently urged toward the stationary contact plate 17, the wire lengths being twisted adjacent their central bend, whereby to hold a contact button 22 for engagement with the plate. The intermediate portions of the wire lengths are oppositely bowed to fit the groove head portion 15′ of the tappet pin 15, whereby outward movement of the tappet pin, upon engagement by an armature core within the solenoid, will open the switch.

This armature core of the solenoid, which will be later described in detail, comprises the piston stem of a dash-pot arrangement, including a cylinder 23, having an integral bottom closure and provided with a top closure plate 24, having its peripheral portion pressed downwardly and then upwardly at its extremity, to define a flange frictionally engaging in the upper end of the cylinder 23. The closure plate is provided with a central plunger aperture and has its portions surrounding said aperture depressed to form a shoulder adapted to engage about the shoulder of the frame, formed in the present instance, by the projected end of the core sleeve 12, whereby to properly center the dash-pot cylinder in its assembled position.

The dash-pot is detachably held against the frame by a single length of spring wire, bent in substantially U-shape to provide a yoke 25, and having its ends bent inwardly to form pintles engaged in recesses 26 in the central edge portions of the lower side of the frame. The legs of the yoke are sinuously bent to permit resilient extension thereof, and the bight portion of the yoke is engageable in central recesses formed in a pair of ribs 27 on the bottom of the dash-pot cylinder, said ribs being curved to provide slide surfaces for the bight of the yoke, and the central portion of the bight is outwardly bent between its rib engaging portions to form a finger piece 28. The yoke will move from the recessed portions of the ribs upon lateral pressure on finger piece 28, and thus the dash-pot cylinder may be most readily assembled or disassembled with respect to the frame by swinging the retaining yoke on the pivots afforded by its pintle ends.

The bottom of the dash-pot is provided with a plurality of upstanding annular wall sections 29, concentric with the wall of the dash-pot cylinder, and a piston 30 is loosely fitted within the dash-pot cylinder and carries a plurality of depending wall sections 31, adapted to loosely fit between the wall sections 29 and the main wall of the cylinder, said piston also carrying a depending central projection 32 engageable in the space bounded by the inner cylinder wall section 29. A pair of upper dash-pot chambers are thus defined at the tops of walls 29, which increase in volume as the piston is drawn upwardly, and a pair of dash-pot chambers are defined at the bottom of the walls 31, together with a third chamber defined at the bottom of the central projection 32 of the piston.

Intake or timing ports 33 extend through the piston and communicate with the upper dash-pot chambers, while relatively large outlet ports 34, having check valve balls 35 therein, are also extended through the piston and communicate with these chambers, the balls being held in place by a plate 36 secured on the piston and having its ends projecting over portions of the outlet ports. A common control for the intake ports 33 is afforded by a timing valve plate 37, pivoted on the piston between the ports and having edge portions projecting over the ports, said plate being movable against considerable friction resistance to thus adjust the flow capacity of the inlet ports and procure a corresponding adjustment of the time interval of operation of the dash-pot upon a given pull.

By reason of the loose fit between the various wall sections, any suitable fluid which is provided for the dash-pot will pass through the ports 33 in lifting movement of the piston and will then flow laterally in the upper dash-pot chambers and pass between the opposed surfaces of the various wall portions into the lower dash-pot chambers defined by the sliding interfit of the walls. A tortuous path is thus afforded for the fluid in the retarding operation of the dash-pot parts, whereby to materially increase such retarding action by reason of the inertia and increased friction of the fluid in following such tortuous paths.

The interior of the dash-pot cylinder is provided with longitudinal channels 38, extending from its top to a point adjacent the tops of the wall sections 31. Thus, as the piston is raised during the desired time interval of the detent action, the limit of such interval will be determined by movement of the piston wall portions past the tops of the cylinder wall portions, at which time free flow of fluid under the piston will be permitted through channels 38, thus permitting a quick upper movement of the piston at the limit of its desired detent action, to procure the required operation of the piston stem. The piston is held against rotation in the cylinder by lugs 39, projecting from its peripheral portion into certain of the channels 38, the width of said lugs being, however, less than the width of the channels, so as not to interfere with free flow of fluid through the channels in the release action.

In the present structure, the stem or plunger of the piston comprises a pair of adjustably connected parts, the upper part constituting an armature core engageable in the sleeve 12, in the form of a cylindrical member 40, having a bore in its lower end portion, threaded to receive a screw 41, which constitutes the lower section of the stem, the head of the screw being preferably cast in the piston body. The upper portion of the armature core 40 is chambered to receive a retaining wire member 42, bent in inverted U shape with the lower end portion of one of the legs further bent in the form of an eye 43, embracing the screw 41, and the other leg extended within a longitudinal slot 44, formed in the side of the core member with its lower end bowed inwardly and constituting a pawl engageable with the screw and adapted to yieldably set in a longitudinal groove 45 cut in the screw, whereby the core member is yieldably held against movement on the screw, the sides of the slot 44 bracing the wire pawl portion against distortion. The upper end of the core member is closed by a cap plate 46, set within its chamber and retaining the spring in place.

The extent to which the armature core projects into the coil in the initial or depressed position of the dash-pot plunger obviously determines the action of the dash-pot mechanism with respect to the amount of current passing through the coil, and the core member may thus be set by adjustment on the screw for the desired operation of dash-pot mechanism at different rates of current. This adjustment can be conveniently effected by simply swinging the holding yoke 25 of the dash-pot cylinder to one side, to permit removal of the cylinder, and then grasping and turning the core member, the piston being held against the turning movement by its lugs 39, as described. This adjustment may be thus effected in a most ready manner without necessitating manipulation of any set screws or other holding members and without disturbing the interior of the dash-pot cylinder.

The periphery of the core member is provided with a series of calibrated graduations 47, whereby it may be set for proper operation under given current conditions, said graduations being read from the edge of the plate 24. The time interval of operation of the dash-pot with respect to a given set of current conditions, is adjusted as described, by means of the valve plate 37, access to said plate being afforded by forcing the top plate 24 from the cylinder, which may be readily done by reason of its frictional fit.

The relay structure illustrated and described is especially applicable to switch boards and, heretofore, it has been necessary to increase the overall height of the switch board panel an inch or more to accommodate the dash-pot and permit the adjustment of the armature and the consequent regulation of the point at which the relay functions. With the dash-pot removably secured flush against the frame member of the relay, its overall length is decreased, permitting a similar decrease in the overall length in the switch panel thus effecting an economy. The dash-pot being removable permits the location of the relay in an out of the way place on the switch board panel inasmuch as the dash pot may be readily detached and taken to a point of light and the armature adjusted.

I have thus provided an exceedingly compact and efficient dash-pot control mechanism, which is of simple and durable construction and which may be most conveniently adjusted for the various conditions of use required.

The device constituting the present embodiment of my invention is commonly termed an overload relay switch, and in use thereof, the solenoid coil 11 would be connected in series with a motor or the like, and the contact members of the device would be connected in series with the coil circuit of the main controlling switch. The dash-pot mechanism affords an inverse time limit on the operation of the switch, causing the actuating armature core 40 to move slowly on a mild over-load and permitting its very rapid movement on a serious over-load. This time limit feature makes it possible to set the switch so as to protect the motor against bona fide, dangerous over-load and yet prevent operation of the switch and consequent stopping of the motor incidental to temporary, trivial over-load conditions, the retarding action of the switch also serving to prevent its operation during the relatively heavy current period necessary in starting a motor.

What I claim as my invention is:

1. A device of the character described, comprising a solenoid coil, a head member, a screw stem section extending from the head member, an armature core section threaded on the screw section and provided with a slot in its side, and a spring pawl member in said slot and engaging the screw section.

2. A device of the character described, comprising a screw stem section, a movable member threaded on the screw section and having a chamber in its outer end communicating with a slot in the side thereof, and a length of spring in said chamber bent with one end portion extended in the slot and engaging the screw section.

3. A device of the character described, comprising a screw stem section, a movable member threaded on the screw section and having a chamber in its outer end communicating with a slot in the side thereof, and a length of spring in said chamber bent in substantially U-shape with one end portion in the slot and engaging the screw section.

4. A device of the character described, comprising a movable member having a chamber in one end with a threaded bore in the other end communicating therewith and a slot in its side communicating with the bore, a screw stem adapted to be threaded in said bore, and a spring in said chamber bent with one end portion curved and extended in the slot and its other end portion formed into an eye through which the screw section passes.

5. A device of the character described, comprising a movable member having a chamber in one end with a threaded bore in the other end communicating therewith and a slot in its side communicating with the bore and the chamber, a screw stem adapted to be threaded in said bore, a spring in said chamber bent in substantially U-shape with one end portion extended in said slot and engaging the screw section, and means closing the outer end portion of said chamber.

6. A device of the character described, comprising a solenoid coil, a head member, a stem extending from the head member, an armature core movable upon the stem, and resilient means carried by the core for engagement with the stem to hold the two in a predetermined adjusted position.

7. A device of the character described, comprising a solenoid coil, a head member, a stem extending from the head member, an armature core movable upon the stem, and resilient means carried by the core and engageable with the stem for locking the two in a predetermined adjusted position.

8. In a control mechanism, the combination of an actuating solenoid coil, a dash-pot detachably connected at one end of the coil, a piston movable within the dash-pot, a threaded stem carried by the piston, a solenoid plunger receiving therein the threaded portion of the stem, and resilient means carried by the plunger and engageable with the stem for holding the plunger in a predetermined position upon the stem.

9. In a control mechanism, the combination of an actuating solenoid coil, a dash-pot detachably connected at one end of the coil, a piston movable within the dash-pot, a threaded stem carried by the piston, a solenoid plunger movable upon the stem, and spring actuated means carried by the plunger and adapted to engage the stem for locking the two in a predetermined adjusted position.

10. In a control device, the combination of a solenoid coil, a dash-pot chamber detachably mounted at one end of the coil, a piston in said chamber, longitudinal channels in the chamber for permitting free flow of fluid past the piston during a certain portion of its movement, a solenoid plunger comprising an inner section carried by the piston, and an outer section threadedly connected with the inner section and extending into the solenoid coil and lugs on the piston engaging in the channels to prevent rotation of the piston upon adjusting rotation of the outer plunger section.

11. A device of the character described, comprising a solenoid coil, a head member, a stem extending from the head member, an armature core movable upon the stem, and means carried by the core and movable in a plane at right angles to the stem for engagement therewith for holding the core in a predetermined position upon the stem.

12. A switch mechanism of the class described, comprising a solenoid coil, a stationary contact member at one side of the coil, a movable contact member formed of a single length of wire, doubled upon itself and having its end portions secured at the opposite side of the coil, said member being resiliently urged toward the stationary contact member, a tappet pin slidable co-axially with the coil, the intermediate portions of the wire being oppositely bowed to embrace and hold the pin and a solenoid core slidable in the coil and engageable with said pin to open the switch.

13. A device of the character described, comprising a solenoid coil, a head member, a stem extending from the head member, a hollow armature core movable upon the stem and having therein a slot, and resilient means positioned within the core and movable through the slot for engagement with the stem for holding said core in a predetermined position upon the stem.

14. An over-load relay of the character described, comprising a solenoid coil, a head member, a screw stem section extending from the head member, an armature core section threaded on the screw section and provided with a head in the side thereof, and spring means carried by the armature core section and against which the screw stem section works as the same is threaded into the core section.

15. An over-load relay of the character described, comprising a frame member, a solenoid mounted in the frame member, a dash-pot chamber secured flush against one side of the frame member, a piston in the chamber, a screw stem extended from the piston, an armature into which the screw stem is threaded, the armature being adjustable on the screw stem to regulate the distance the armature projects to the solenoid when the piston is in its normal position, spring means within the armature and tensioning against the screw stem as it is threaded thereinto, and a circuit closure mounted on the other side of the frame member and operable upon movement of the armature into the solenoid.

16. An over-load relay of the character described, comprising a frame member, a solenoid mounted in the frame member, a dash pot chamber, means detachably securing the dash-pot chamber flush against one side of the frame member, a piston workable in the chamber, an armature extendible into the solenoid, an adjustable connection between the piston and the armature wherein the distance the armature projects in the solenoid when the piston is in its normal inactive position may be adjusted, and a circuit closure on the other side of the frame member and operable by movement of the armature into the solenoid.

17. An over-load relay of the character described, comprising a frame member, a solenoid mounted in the frame member having a central bore, a dash-pot chamber secured flush against one side of the frame in communication with the solenoid bore, a piston in the chamber, an armature extendible into the solenoid bore, an adjustable connection between the piston and armature whereby the dash-pot chamber may be detached from the frame member and the distance between the armature and the piston adjusted to regulate the distance the armature projects into the solenoid when the dash-pot chamber is secured in place against the frame member, and a circuit closure mounted on the other side of the frame member and operable by movement of the armature into the solenoid.

In testimony whereof I hereunto affix my signature.

GUSTAV O. WILMS.